Oct. 14, 1969    C. R. HILPERT    3,472,348
CLUTCH HAVING RADIALLY SHIFTABLE MEANS TO PREVENT FLUTTER
Original Filed June 2, 1967    4 Sheets-Sheet 1
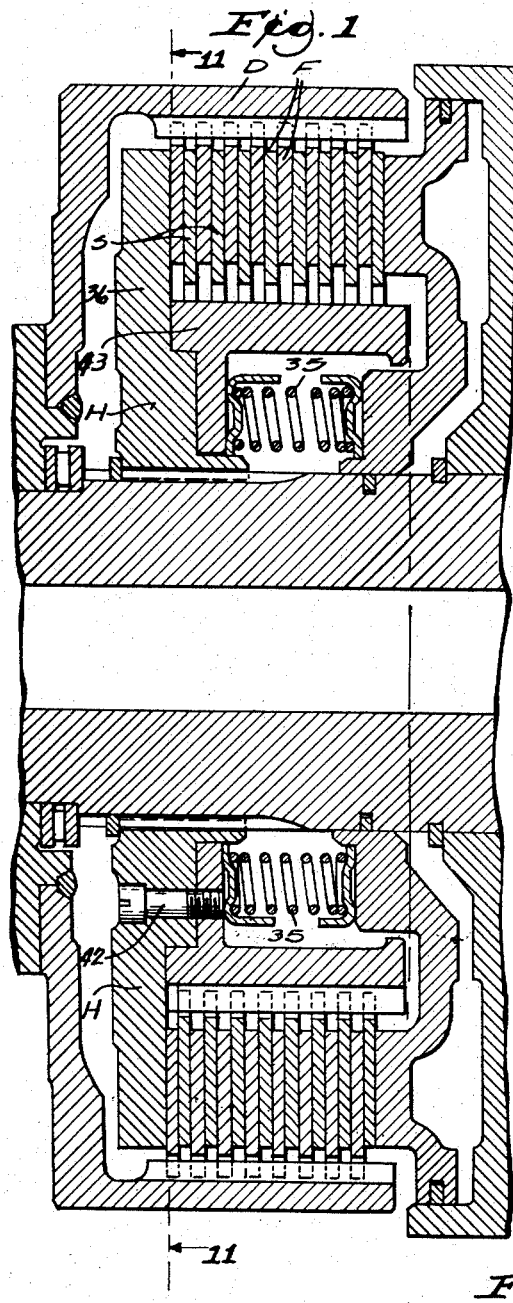
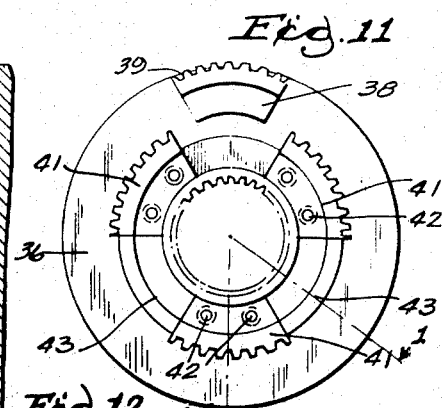
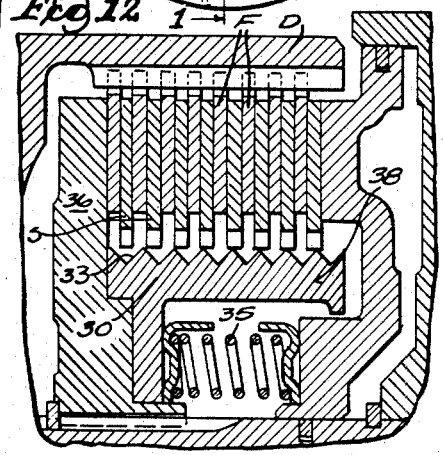
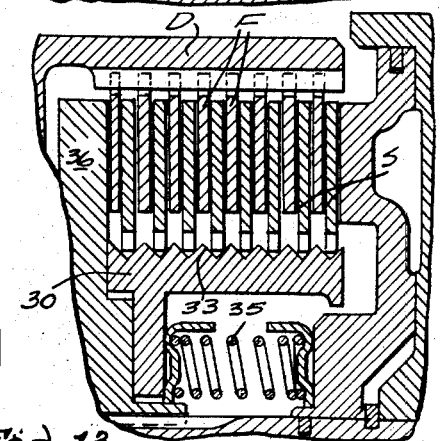
INVENTOR:
CONRAD R. HILPERT
BY: James E. Miller
ATTORNEY Oct. 14, 1969 C. R. HILPERT 3,472,348
CLUTCH HAVING RADIALLY SHIFTABLE MEANS TO PREVENT FLUTTER
Original Filed June 2, 1967 4 Sheets-Sheet 3
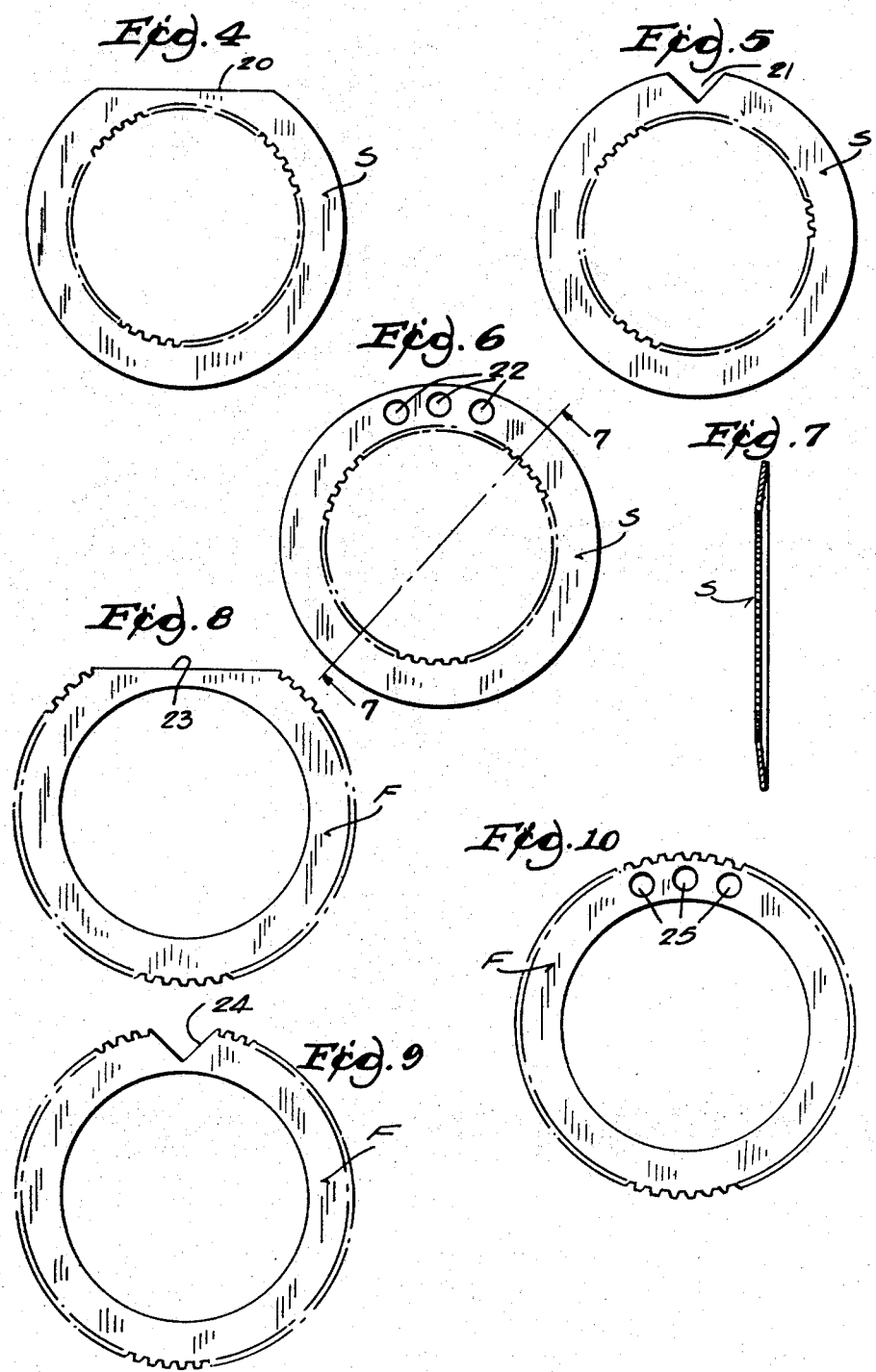
INVENTOR:
CONRAD R. HILPERT
BY: James E. Nilles
ATTORNEY Oct. 14, 1969     C. R. HILPERT     3,472,348

CLUTCH HAVING RADIALLY SHIFTABLE MEANS TO PREVENT FLUTTER

Original Filed June 2, 1967     4 Sheets-Sheet 4

INVENTOR:
CONRAD R. HILPERT
BY: James E. Nilles
ATTORNEY

United States Patent Office 3,472,348
Patented Oct. 14, 1969

3,472,348
CLUTCH HAVING RADIALLY SHIFTABLE MEANS TO PREVENT FLUTTER
Conrad R. Hilpert, Winnebago, Ill., assignor to Twin Disc, Incorporated, Racine, Wis., a corporation of Wisconsin
Original application June 2, 1967, Ser. No. 643,245. Divided and this application Sept. 23, 1968, Ser. No. 761,697
Int. Cl. F16d 13/42, 23/00
U.S. Cl. 192—70.23                        7 Claims

ABSTRACT OF THE DISCLOSURE

Means for preventing disengaged clutch plates from fluttering, that is, from wobbling like a coin that is coming to rest after it has been spinning on its edge. This gyroscopic instability, caused when the plates do not rotate in a plane normal to the clutch axis, occurs when alternate plates rotate in opposite directions.

CROSS REFERENCE TO A RELATED APPLICATION

This application is a divisional of U.S. Ser. No. 643,245, filed June 2, 1967, which issued as Patent No. 3,446,323 on May 27, 1969.

BACKGROUND OF THE INVENTION

Friction plate clutches which have interleaved friction plates, and the alternate plates of which rotate in opposite direction, present serious problems due to flutter, wobble or gyroscopic instability of the plates. This flutter can occur in either the externally toothed plates connected to the interior of the clutch drum or in the internally toothed plates connected to the central hub of the clutch, or both; it is usually more prevalent in the externally toothed plates. When the clutch is supposed to be running in a disengaged position, plate flutter may suddenly cause a great increase in drag torque, thus causing extreme heat and burned plates, lock up of the clutch and total destruction.

When the usual symptoms of flutter occurred in the prior art, common practices to attempt to eliminate the symptoms were to grossly increase the amount of cooling oil flowing past the plates, or insert small springs between the plates. While these practices did provide some improvement under certain conditions, they were not generally satisfactory.

SUMMARY OF THE INVENTION

The present invention provides means for eliminating flutter in counter rotating clutch plates by limiting or damping axial movement of the plates in their drums or on their hubs.

According to the present invention, the means for preventing flutter of the plates are centrifugal weights mounted on the hub, which weights restrain axial movement of the plates either mechanically or by friction. For example, these centrifugally actuated weights may be notched on their periphery to receive and guide the internal periphery of the plates, thereby properly spacing and mechanically holding these plates. The weights may also be of the smooth type which are centrifugally actuated to cause high frictional damping between the internal teeth and the hub splines in which they are mounted. In either the notched or smooth type centrifugal weights, they may be spring biased toward the clutch backing plate.

In addition to the above mentioned weights, the invention contemplates the use of externally toothed and split plates which form a plurality of pieces or segments, thereby causing additional frictional damping of axial movement at the external teeth of the plate. In other words, splitting of the plates causes their unbalance, permitting centrifugal force to cause high frictional damping against axial movement between the external teeth of the plates and the axial grooves in which they are located.

Another additional means provided by the present invention for providing unbalance of either the external or internal toothed plates, or both, and consequent high frictional damping against axial movement, is to circumferentially unbalance the weight of the plates. This unequal weighting may be accomplished by removing a portion from one side of the plates, for example, by drilling holes, forming notches or by cutting along a chord and removing a portion from adjacent the periphery of the plate.

The invention also contemplates the use of split or otherwise unbalanced external teeth plates together with unbalanced internal teeth plates.

Various combinations of the above means may be used in accordance with the present invention.

These and other objects and advantages of the present invention will appear as this disclosure progresses.

BRIEF DESCRIPTION OF THE DRAWINGS

FIGURE 1 is a longitudinal, cross sectional view through a hydraulically actuated friction clutch utilizing the present invention and showing the smooth type centrifugal weight modification of the invention;

FIGURES 4 to 6 are views of internally toothed clutch plates showing various ways in which material may be removed therefrom to result in unequal weighting or unbalance of these plates;

FIGURE 7 is a sectional view taken along lines 7—7 in FIGURE 6 and showing the "coned" shape of these internally toothed plates;

FIGURES 8 to 10 are views similar to FIGURES 4 to 6, but the unbalance being applied to externally toothed plates;

FIGURE 11 is a transverse, sectional view taken along line 11—11 in FIGURE 1, but on a reduced scale, and with one of the radially shiftable weights being shown in an "exploded" or removed position for the sake of illustration;

FIGURES 12 and 13 are fragmentary views similar to FIGURE 1 but showing the notched or grooved type of centrifugal weight, in the clutch engaged and disengaged positions, respectively;

DESCRIPTION OF THE PREFERRED EMBODIMENT

The following description will be directed to a friction clutch of the type having interleaved clutch plates.

Some of these plates have external teeth around their outer periphery which are rotationally fixed in an internally splined or grooved clutch drum. These plates will be referred to as externally toothed plates and are usually faced with a waffle pattern for cooling and wear purposes. Flutter of these externally toothed plates may be referred to as "normal" flutter.

The other plates are internally toothed plates and are axially slidably on the splines of a clutch hub and are sometimes referred to as steel plates. These plates may be "coned," that is slightly dished-shaped, say 0.010 to 0.015 of an inch across the width of their ring, and this "coning" reduces the maximum possible "run out." Run out is the axial distance the plates and the actuating member must move to cause clutch clamp-up. These coned plates flatten out when clamped up. Flutter of these plates may be referred to as "inverse" flutter.

Plate flutter occurs when the clutch is disengaged in counter-rotating clutches, that is, where one set of plates rotates in one direction and the alternate plates rotate in the opposite direction and it is to this environment that the present invention is directed.

Flutter is a term which will be used herein to describe the movement of the plates in rotating in a plane other than normal to the clutch axis and with a whirl or wobble. Perhaps flutter can best be described as similar to the action of a coin that had been set on its edge and spun, and then starts to come to rest by "walking around" on its rim, in one location. This flutter can increase the torque of the clutch when it is supposed to be released, and causes burn out of the plates, and damage to the entire clutch and associated parts.

Flutter is due to "gyroscopic instability" of the plates, and is not (as previously thought by many skilled in the prior art) due to "hydrodynamic pumping action" of the plates. Flutter symptoms could be eliminated by the simple expedient of gross increases in cooling oil flow between the plates, but on the other hand flutter also existed when no cooling oil flow occurred.

It may also be helpful at this juncture to discuss Euler's equation of motion in connection with an explanation of clutch flutter. As found in S. Timoshenko and D. H. Young's book "Advanced Dynamics," (first edition, chapter V, page 346, figure 260, equation 170, McGraw-Hill New York 1949) this equation is as follows:

$$-Mn = -[Iw + (I - I_1)w_1 \cos \theta] w_1 \sin \theta$$

Figure 1A:
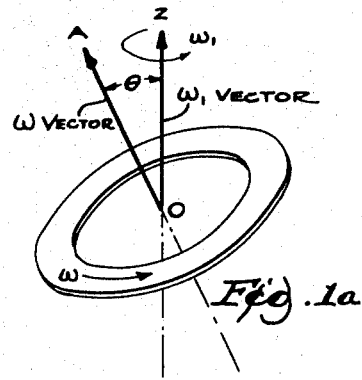
FIGURE 1a is a diagram of certain forces as applied to a clutch plate.

Reference is also made to FIGURE 1a of the drawings which shows a diagram of these forces as applied to a clutch plate.

In the above equation, the symbols are defined as follows:

$Mn$ = moment in AOZ plane tending to change value of $\theta$.
$I$ = moment of inertia of disc about disc axis (AO).
$I_1$ = moment of inertia of disc about a diameter.
$w$ = rotational velocity of disc about disc axis (AO).
$w_1$ = rotational velocity of disc axis about intersecting an inclined axis (ZO).
$\theta$ = angle between disc axis (AO) and inclined axis (ZO).

The above formula may be applied to a clutch and in this respect reference is made to FIGURE 1 of the drawings where the clutch drum D has the externally tooth disc plates F fixed thereto for rotation therewith but for axially sliding relative thereto in the known manner. The clutch hub H has the internally toothed discs S similarly splined thereto for axially sliding on the hub and for rotation therewith. The total indicated runout or wobble of the discs is the total clearance between the clutch plates. Reference may be had to said co-pending application if a detailed discussion of this formula as applied to this clutch is deemed desirable.

Figure 2:
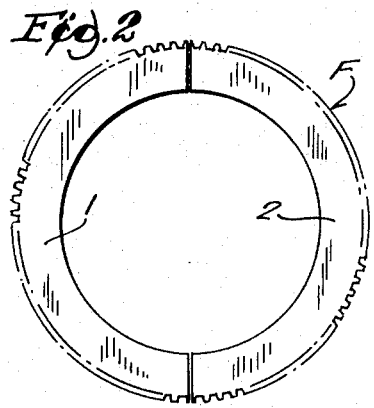
FIGURES 2 and 3 are transverse views, on a reduced scale, of externally toothed clutch plates used with the present invention.
Figure 3:
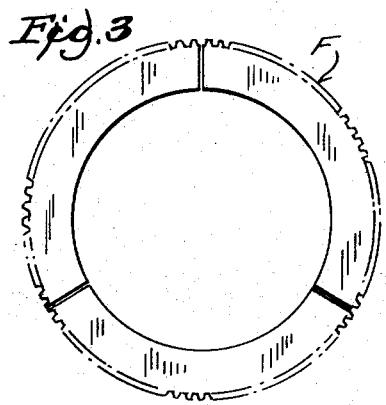

Referring in greater detail to the drawings, externally toothed plates F are formed as a number of segments, that is splitting the disc, preferably into two halves as shown in FIGURE 2. Other numbers of segments may be used, say for example three (see FIGURE 3), but numbers greater than this are undesirable because the individual pieces tend to spin or turn on their own individual axes. As shown in FIGURE 2, the externally toothed discs F are split in two halves 1 and 2, and centrifugal force causes these halves to move outwardly, thus creating frictional forces of the teeth against their grooves or splines in the clutch drum D.

I am aware that clutch plates have been split, per se, to facilitate assembly or to eliminate torsional vibration rattle.

It may be mentioned that the plates S cannot be split, as above described for plates F, in order to achieve this unbalance, because centrifugal force acts to actually disengage the internal teeth of the plate S from the hub, contrary to the desired result.

FIGURES 4 TO 10

In FIGURES 4 to 10, means for unbalancing either of the plates F or S are provided.

I have found that shifting the weight of the plates S so that they are unbalanced as to weight, creates the necessary friction on their internal teeth with the hub H so that axial movement is damped. This arrangement is shown in FIGURES 4 to 7 where portions 20, 21 and 22 are cut out from the plates at one side thereof.

FIGURES 8 to 10 show similar portions 23, 24 and 25 cut out from externally toothed plates F.

In this manner, either the internal or external toothed plates, or both, may be unbalanced by shifting their weight out of concentricity, that is for example, by removing a portion of the metal from one side of the plates, that is, from circumferentially unequal portions.

Either splitting the plates F, as previously described, or by unbalancing plates F or S, or both, by shifting their weight (that is by removing metal, for example), friction is created to help eliminate flutter, and in addition it forces the plates to tend to rotate normal to the centerline of the clutch. That is to say, centrifugal force tends to cause the heavier side to straighten the plates.

According to the invention, means, such as centrifugally actuated and radially shiftable weights mounted on the hub H, are urged against the internally toothed plates S to hold them in alignment. A spring 35 urges the weights, along with the associated plates, in an axial direction against the back up member 36 of the clutch hub H.

Figure 14:
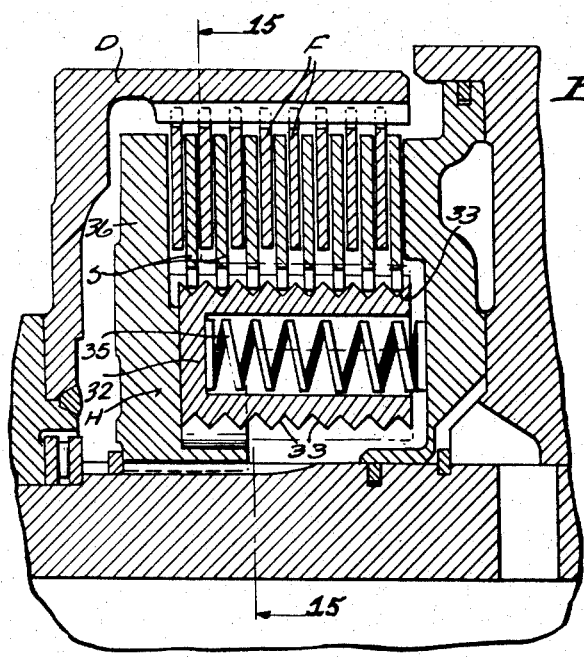
FIGURE 14 is a view similar to FIGURE 13, but showing a grooved roller type of centrifugal weight, and with the clutch in the disengaged position.
Figure 17:
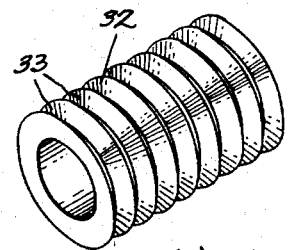
FIGURE 17 is a perspective view of the roller shown in FIGURE 14.
Figure 15:
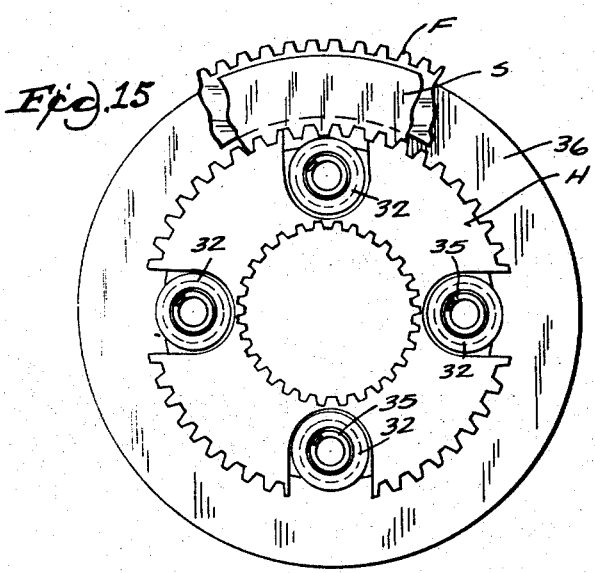
FIGURE 15 is a cross sectional view taken generally along line 15—15 of FIGURE 14, certain parts being shown as broken away or removed for clarity in the drawings and in the clutch engaged position.
Figure 16:
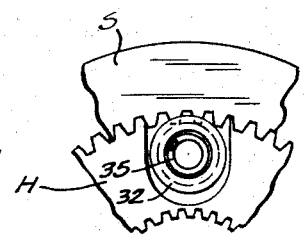
FIGURE 16 is a fragmentary detail view of a portion of the FIGURE 15 device but with the clutch in the disengaged position and thus the roller in a radially outward position.

The grooved weights 30 or 32 shown in FIGURES 12, 13 and 14, respectively, mechanically hold the plates S in properly spaced relationship and resiliently prevent axial movement or flutter of these plates S. The grooved weights are urged into contact with the plates S which then seat themselves in the grooves 33, thus holding the plates S captive in the grooves and properly separated where they cannot shift axially and flutter. When the clutch is engaged, the weights are urged radially inward against centrifugal force, permitting clamp up of the clutch.

As shown in FIGURES 1 and 11, other pie-shaped weights 38, without grooves, may be urged by centrifugal force against plates S to thereby create the necessary frictional forces to prevent axial shifting or flutter of plates S. This ungrooved weight 38 (FIGURE 11) may simply have longitudinally splines 39 on its periphery to match the rest of the splines of the hub members 41 fixed by bolts 42 to the hub proper, so as to firmly push against the teeth of plates S, or it may be entirely smooth as is segment weight 43 (FIGURE 11).

I claim:
1. In a counter-rotating, interleaved friction plate clutch of the type having a rotatable drum and also a rotatable hub, said drum and hub rotating in opposite directions when said clutch is disengaged, externally toothed plates mounted for axial sliding on the interior of said drum and for rotation therewith, internally toothed plates axially slidable on said hub for rotation therewith, and means to cause axial shifting of said plates between clutch disengaged and engaged positions, the improvement comprising means for causing unbalance of at least some of said plates to thereby create frictional forces between the teeth of at least some of said plates and the member on which they are mounted to thereby dampen axial flutter movement of said plates when said clutch is in a disengaged position, said means comprising radially shiftable weights mounted on said hub for rotation therewith and caused by centrifugal force to be urged against said internally toothed plates.

2. The clutch as described in claim 1 further characterized in that said weights have grooves in which said internally toothed plates are mechanically and resiliently held in properly spaced relationship and prevented from axial flutter movement.

3. The clutch as set out in claim 1 further characterized in that said weights create frictional forces at the teeth of said internally toothed plates to dampen axial movement of the latter.

4. The clutch as defined in claim 1 further characterized in that said externally toothed plates are split and formed by a plurality of segments to permit centrifugal force to cause frictional force build up between the external teeth and said drum to thereby eliminate axial flutter movement of said plates.

5. The clutch as set forth in claim 1 further characterized in that at least some of said plates have portions removed from circumferentially unequal portions thereof to also cause unbalance of said plates.

6. The clutch described in claim 1 in combination with internally toothed plates, some of which have portions removed from circumferentially unequal portions thereof to also cause unbalance of said internally toothed plates.

7. The clutch as claimed in claim 5 further defined in that both the internally and externally toothed plates have portions removed from along only a portion of their circumferential length to cause weight unbalance of said plates.

References Cited
UNITED STATES PATENTS

| | | | |
|---|---|---|---|
| 814,132 | 3/1906 | Hele-Shaw | 192—107 XR |
| 860,590 | 7/1907 | Williams | 192—107 XR |
| 991,482 | 5/1911 | Cox | 192—107 XR |
| 1,189,176 | 6/1916 | Price | 192—107 XR |
| 1,555,370 | 9/1925 | Heidegger | 192—104 |
| 2,330,856 | 10/1943 | Adamson | 192—70.14 |
| 3,263,509 | 8/1966 | Digby | 192—104 XR |

MARTIN P. SCHWADRON, Primary Examiner

L. J. PAYNE, Assistant Examiner

U.S. Cl. X.R.

192—104, 107